Patented June 19, 1923.

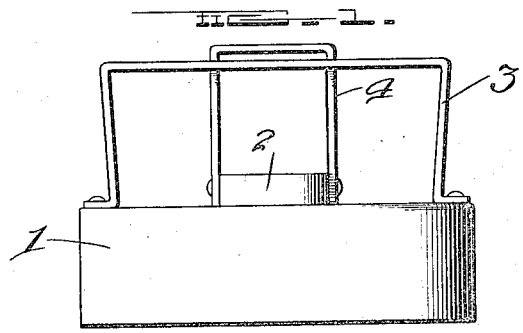
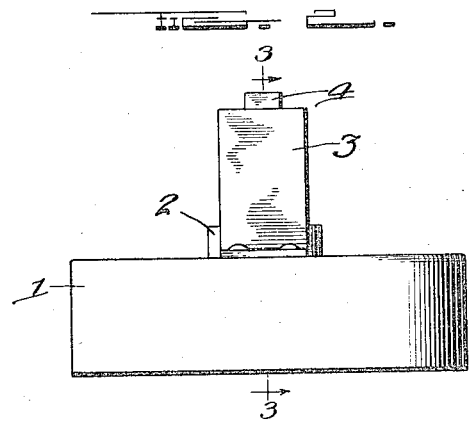
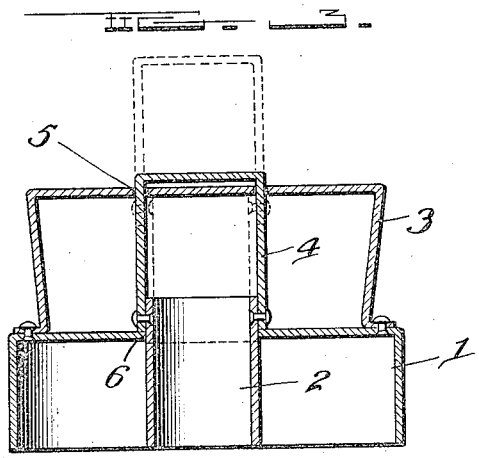

1,459,296

UNITED STATES PATENT OFFICE.

RUSSELL H. STAMBAUGH, OF GALESBURG, ILLINOIS.

CUTTER.

Application filed February 2, 1922. Serial No. 533,639.

*To all whom it may concern:*

Be it known that I, RUSSELL H. STAMBAUGH, a citizen of the United States of America, residing at Galesburg, in the county of Knox and State of Illinois, have invented certain new and useful Improvements in Cutters; and I do hereby declare that the following is a full, clear, concise, and exact description of the same, such as will enable others skilled in the art to which it appertains to make and use the same.

This invention relates to improvements in culinary implements having for an object to provide a device for cutting dough and like matter into various configurations, the invention being of such design that material may be cut into various shapes at the will of a user.

It is also an object of the invention to provide a device particularly adaptable for use in a bakery or similar establishment, capable of being used as a cutter for biscuits, cookies or similar articles, and which, upon slight alteration, may be conveniently used as a doughnut or cruller cutter, the arrangement of the device being simple and compact whereby to produce desired results with a minimum amount of effort upon part of a user.

Other objects will be in part obvious and in part pointed out hereinafter.

In order that the invention and its mode of operation may be readily understood by persons skilled in the art, I have in the accompanying illustrative drawings and in the detailed following description based therein, set out one possible embodiment of the same.

In these drawings:

Figure 1 is a front elevation of the improved device;

Figure 2 is an elevation taken at right angles to the Figure 1; and,

Figure 3 is a section through the device taken on the line 3—3 of Figure 2, looking in the direction in which the arrows point, and showing the inner cutter member of the device in raised or elevated position.

Having more particular reference to the drawings, in connection with which like characters of reference will designate corresponding parts throughout, the device comprises a circular shell or outer cutter member 1 and a correspondingly shaped inner cutter member 2, concentrically arranged in said outer cutter member 1, the several cutter members 1 and 2, being formed of aluminum or other similar material. These cutter members consist of a casing having a cutting edge, the casing of the member 2 being of a slightly greater depth than the casing of the member 1, and are each provided with a handle, 3 and 4, respectively, riveted or otherwise firmly secured to said casings.

Arranged in the upper portion of the outer cutter member 1 is an opening 6 conforming in size and shape to that of the inner cutter member 2, in which said inner cutter member 2 is adapted to be received and in which it has removable or sliding engagement, for a purpose which will be hereinafter more fully set out. In order that the removable engagement of the inner cutter member 2 may be controlled at will by a user, that is, so that the cutting edge of the inner cutter member 2 may be either brought into contact with the material to be cut or not, as may be desired, the handle 4 of the cutter member 2 is slidably received in slots or openings 5 in the upper portion of the handle 3 of the outer cutter member 1, which handle, as will be understood, may be raised, so as to move the cutting edge of the inner cutter member 2 from engagement with the material to be cut, or lowered, if it is desired to cut the material with the inner cutter member 2. It will therefore be understood that should it be desired to use the device as a biscuit or cookie cutter, the inner cutter member 2 is raised from its lowered position as shown in dotted lines in the Figure 3, by means of the handle 4 whereupon pressure may be applied to the handle 3 of the outer cutter member, whereby the cutting edge of said member will function to cut the material into the size and shape of said outer cutter member 2. However, should it be desired to cut the material into some other design, such for example as a doughnut or cruller, the handle 4 of the inner cutter member 2 is forced downwardly, thus bringing the cutting edge of the inner cutter member 2 onto a level with the cutting edge of the outer cutter member 1 whereby upon pressure being applied to said cutter members, the cutting edges of both of the same will cut the material into the configuration of both the outer and inner cutter members.

From the foregoing, it will be understood that I have provided a device capable of cutting material into any desired form provided for by the cutting edges of its several cutter members, the inner cutter member of the device being capable of being moved into or out of engagement with the material to be cut, whereby the material may be cut into different forms, such movement of the inner cutter member being easily and quickly effected at will by a user.

While I have hereinbefore described with some degree of particularity, the particular shape and design of the several cutter members 1 and 2, it is to be expressly understood that the device may be constructed in any desired configuration, such as conditions or preference may dictate. Furthermore, it is to be likewise understood that the shape of the inner cutter member 2 need not correspond to that of the outer cutter member 1, and that said inner cutter member may be arranged at any point within the casing comprising the outer cutter member 1, such arrangement being optional with the user.

Manifestly, the construction shown is capable of considerable modification and such modification as is within the scope of my claim, I consider within the spirit of my invention.

I claim:

In a device for cutting articles into various configurations comprising an outer cutter member and an inner cutter member arranged concentrically therewith, a top formed with said outer cutter member, a handle, said handle being secured to said top and having a horizontal portion parallel to said top, said top having a centrally located opening therein adapted to receive said inner cutter member, a handle secured to the upper end of said inner cutter member, the handle of the inner cutter member being provided with vertical side members, the horizontal portion of the handle of said outer cutter member having openings therein through which are adapted to pass the vertical portions of the inner cutter member handle, and said top and horizontal portion of the handle of said outer cutter member being adapted to form guides for the inner cutter member whereby said inner cutter member will be stabilized during its cutting operation.

In witness whereof I have hereunto set my hand.

RUSSELL H. STAMBAUGH.